US 6,606,988 B2

(12) United States Patent
Clark

(10) Patent No.: US 6,606,988 B2
(45) Date of Patent: Aug. 19, 2003

(54) SOLAR OVEN HAVING A MULTIPLE ZONE CONCENTRATOR

(76) Inventor: Walter E. Clark, 4601 McConnell Rd., McLeansville, NC (US) 27301

( * ) Notice: Subject to any disclaimer, the term of this patent is extended or adjusted under 35 U.S.C. 154(b) by 0 days.

(21) Appl. No.: 09/877,934

(22) Filed: Jun. 8, 2001

(65) Prior Publication Data

US 2002/0195099 A1 Dec. 26, 2002

(51) Int. Cl.⁷ .................................................. F24J 2/02
(52) U.S. Cl. ...................................... 126/696; 126/682
(58) Field of Search ........................... 33/268; 126/681, 126/424, 25, 271, 451, 682, 951, 696; 99/349; 359/883; 60/698

(56) References Cited

U.S. PATENT DOCUMENTS

| | | | |
|---|---|---|---|
| 4,023,368 A | * 5/1977 | Kelly | 60/698 |
| 4,059,094 A | * 11/1977 | Barrio de Mendoza | 126/271 |
| 4,296,731 A | * 10/1981 | Cluff | 126/424 |
| 4,320,699 A | * 3/1982 | Binks | 99/349 |
| 4,364,183 A | * 12/1982 | Rhodes | 33/268 |
| 4,602,613 A | * 7/1986 | Barr | 126/424 |
| 5,139,010 A | * 8/1992 | Borgens, Jr. et al. | 126/451 |
| 5,178,126 A | * 1/1993 | Beller | 126/25 |
| 5,617,843 A | * 4/1997 | Erwin | 126/681 |
| 5,760,981 A | * 6/1998 | Gillich | 359/883 |

* cited by examiner

Primary Examiner—Henry Bennett
Assistant Examiner—Sabrina Dagostino
(74) Attorney, Agent, or Firm—MacCord Mason PLLC

(57) ABSTRACT

A solar oven that includes a multiple zone concentrator and a diffuse focal zone is disclosed. The solar oven may include at least one element of symmetry. In such a case, the diffuse focal zone substantially aligns with the oven symmetry element. The diffuse focal zone may include a central region and a peripheral region. The multiple zone concentrator has at least one reflective member for directing radiation to a plurality of portions of the diffuse reflective zone. The reflective member has a first reflective zone and a second reflective zone. The first reflective zone may include at least one of zonal element of symmetry offset from the oven symmetry element. Also, the first reflective zone has a profile that captures and directs radiation to at least a portion of the peripheral region of the diffuse focal zone. The second reflective zone is adjacent a first end of the first reflective zone and has a profile that captures and directs radiation to at least a portion of the central region of the diffuse focal zone. A receptor support is provided for supporting a receptor substantially within the diffuse focal zone. Optionally, a booster adjacent a distal end of the first reflective zone is provided for directing additional radiation to at least one of the peripheral region and the central region of the plurality of portions of the diffuse focal zone.

112 Claims, 7 Drawing Sheets

SOLAR OVEN HAVING A MULTIPLE ZONE CONCENTRATOR

BACKGROUND OF THE INVENTION (1) Field of the Invention

The present invention relates generally to a solar oven having a multiple zone concentrator and a diffuse focal zone and, more particularly, to a solar oven having a multiple zone concentrator including a booster and a diffuse focal zone.

(2) Description of the Prior Art

Solar energy has been used from the beginning of time for heating. In time, man learned that by concentrating solar energy higher temperatures could be achieved. During the energy shortage of the 1970's in the United States, many resources were used to develop different types of solar concentrating devices. Some of the developed devices, although effective, required complicated technology to track the sun throughout the day or to convert and transmit the concentrated solar energy for use. Technical precision and instrumentation made such solar devices expensive and difficult to manufacture and maintain.

Solar concentrators as ovens for cooking are known. However, technical precision, instrumentation, and complex materials for such solar concentrators have prevented the ovens from being readily available to the general population. Most had sharp focal zones. Many were sized to collect an inadequate amount of energy, particularly for cooking a reasonable amount of food in a reasonable amount of time. An operator for such solar concentrators as ovens typically should have an advanced understanding of engineering and technology. That is to say, such solar concentrators as ovens are not user friendly.

Thus, there remains a need for a new and improved solar oven having a multiple zone concentrator and a diffuse focal zone. Such a solar oven preferably is robust and simple to manufacture and maintain, while at the same time the inclusion of a booster on such a solar oven would further contribute to the oven's flexibility.

SUMMARY OF THE INVENTION

The present invention is directed to a solar oven that includes a multiple zone concentrator and a diffuse focal zone. The solar oven may include at least one element of symmetry. In such a case, the diffuse focal zone substantially aligns with the oven symmetry element. The diffuse focal zone may include a central region and a peripheral region. The multiple zone concentrator has at least one reflective member for directing radiation to various portions of the diffuse reflective zone. The reflective member has a first reflective zone and a second reflective zone. The first reflective zone may include at least one of a zonal element of symmetry offset from the oven symmetry element. Also, the first reflective zone has a profile that captures and directs radiation to at least a portion of the peripheral region of the diffuse focal zone. The second reflective zone is adjacent to a first end of the first reflective zone and has a profile that captures and directs radiation to at least a portion of the central region of the diffuse focal zone. A receptor support is provided for supporting a receptor substantially within the diffuse focal zone. Optionally, a booster adjacent a distal end of the first reflective zone is provided for directing additional radiation to at least one of the peripheral region and the central region of the various portions of the diffuse focal zone.

In a preferred embodiment, the booster has a straight-line profile. The straight line profile may create an angle from about 2 degrees to about 25 degrees with a tangent to a profile of the first reflective zone at its distal end. A ratio of a length of the booster profile and an aperture length of the at least one reflective member may be about 0.1 to about 0.6. An aperture angle of the at least one reflective member is preferably about 40 degrees to about 120 degrees.

Preferably, the solar oven includes a frame for supporting the at least one reflective member. The solar oven may further include an alignment device for aligning the solar oven with a radiation source. In a preferred embodiment, the alignment device includes a rod substantially parallel to the oven symmetry element and a flat surface substantially perpendicular to the oven symmetry element. A portion of the frame and the at least one reflective member may be integral. Alternatively, the frame and the at least one reflective member are separate. Preferably, the frame includes a base.

In use, a receptor is juxtaposed to the receptor support. The receptor may include at least one absorber such as a coating or finish or both. One coating may be paint. Another coating may be carbon black. Yet another coating may be an anodized coating.

In a preferred embodiment, the at least one absorber and the receptor are integral. The receptor may be at least one of a metal, a ceramic, or a glass. The metal may be at least one of cast iron, steel, aluminum and stainless steel.

In a preferred embodiment, the receptor is cookware. Such cookware may include at least one of a pot, a pan and a sheet.

The receptor support may provide structural reinforcement to the multiple zone concentrator. Also, the receptor support may further include a leveling mechanism such as a universal joint-type.

A thermal insulator may be placed between the receptor and the receptor support. In an embodiment, the insulator stabilizes the receptor. The thermal insulator may be at least one of a polymer, a ceramic or a natural insulating material. For example, abundantly available inexpensive materials such as fiberglass may be preferred.

As stated above, the diffuse focal zone may include a central region and a peripheral region. In a preferred embodiment, the central region is substantially horizontal and the peripheral region is substantially vertical.

In a preferred embodiment, the first reflective zone has a profile that is a conic section such as at least one of a parabola, an ellipse or a hyperbola. More preferably, the conic section is a parabola. A preferred profile of the second reflective zone substantially resembles a portion of a cardioid.

The reflective member is made using a reflective material such as a polished metal that may further include a coating for protecting the polished metal. Preferably, the polished metal is aluminum. Alternatively, the reflective material is a coated polymer. When the reflective material is coated polymer, it is preferably metalized.

As discussed, the solar oven may include at least one element of symmetry and the first reflective zone may include at least one zonal element of symmetry offset from the oven symmetry element. The oven symmetry element may include one of a plane of symmetry and an axis of symmetry. The zonal symmetry element also may include one of a plane of symmetry and an axis of symmetry. Preferably, when the oven symmetry element is a plane of symmetry, the zonal symmetry element also is a plane. Likewise, when the oven symmetry element is an axis of symmetry the zonal symmetry element also is an axis.

Accordingly, one aspect of the present invention is to provide a solar oven including a multiple zone concentrator and a diffuse focal zone. The multiple zone concentrator has at least one reflective member for directing radiation to various portions of the diffuse focal zone. The reflective member has a first reflective zone and a second reflective zone. The first reflective zone has a profile that captures and directs radiation to a first portion of the various portions of the diffuse focal zone. The second reflective zone is adjacent a first end of the first reflective zone. The second reflective zone has a profile that captures and directs radiation to a second portion of the various portions of the diffuse focal zone. A receptor support is provided for supporting a receptor substantially within the diffuse focal zone.

Another aspect of the present invention is to provide a solar oven including at least one of an element of symmetry, a diffuse focal zone or a multiple zone concentrator. The diffuse focal zone is substantially aligned with the oven symmetry element and includes a central region and a peripheral region. The multiple zone concentrator has at least one reflective member for directing radiation to a plurality of portions of the diffuse reflective zone. The reflective member has a first reflective zone and a second reflective zone. The first reflective zone includes at least one of a zonal element of symmetry offset from the oven symmetry element. Also, the first reflective zone has a profile that captures and directs radiation to at least a portion of the peripheral region of the diffuse focal zone. The second reflective zone is adjacent a first end of the first reflective zone. The second reflective zone has a profile that captures and directs radiation to the central region of the diffuse focal zone. A receptor support is provided for supporting a receptor substantially within the diffuse focal zone.

Still another aspect of the present invention is to provide a solar oven including at least one element of symmetry, a multiple zone concentrator and a diffuse focal zone. The diffuse focal zone substantially aligns with the oven symmetry element. The diffuse focal zone includes a central region and a peripheral region. The multiple zone concentrator has at least one reflective member for directing radiation to various portions of the diffuse reflective zone. The reflective member has a first reflective zone and a second reflective zone. The first reflective zone includes at least one of a zonal element of symmetry offset from the oven symmetry element. Also, the first reflective zone has a profile that captures and directs radiation to at least a portion of the peripheral region of the diffuse focal zone. The second reflective zone is adjacent to a first end of the first reflective zone and has a profile that captures and directs radiation to at least a portion of the central region of the diffuse focal zone. A receptor support is provided for supporting a receptor substantially within the diffuse focal zone. Optionally, a booster adjacent a distal end of the first reflective zone is provided for directing additional radiation to at least one of the peripheral region and the central region of various portions of the diffuse focal zone.

Yet another aspect of the present invention is to provide a kit for a solar oven including a multiple zone concentrator and a diffuse focal zone. The multiple zone concentrator has at least one reflective member for directing radiation to various portions of the diffuse focal zone. The reflective member has a first reflective zone and a second reflective zone. The first reflective zone has a profile that captures and directs radiation to a first portion of the various portions of the diffuse focal zone. The second reflective zone is adjacent to a first end of the first reflective zone. The second reflective zone has a profile that captures and directs radiation to a second portion of the various portions of the diffuse focal zone. A receptor support for supporting a receptor substantially within the diffuse focal zone is described. The kit includes a plurality of reflective elements, a template and instructions. Optionally, the kit may include an alignment device for aligning the solar oven with a radiation source. Each reflective element is configurable into at least one portion of at least one reflective member. The template is for configuring the plurality of reflective elements. The instructions provide information for using the template to configuring the plurality of reflective elements to thereby assemble the solar oven.

These and other aspects of the present invention will become apparent to those skilled in the art after a reading of the following description of the preferred embodiment when considered with the drawings.

DESCRIPTION OF THE PREFERRED EMBODIMENTS

Figure 1:
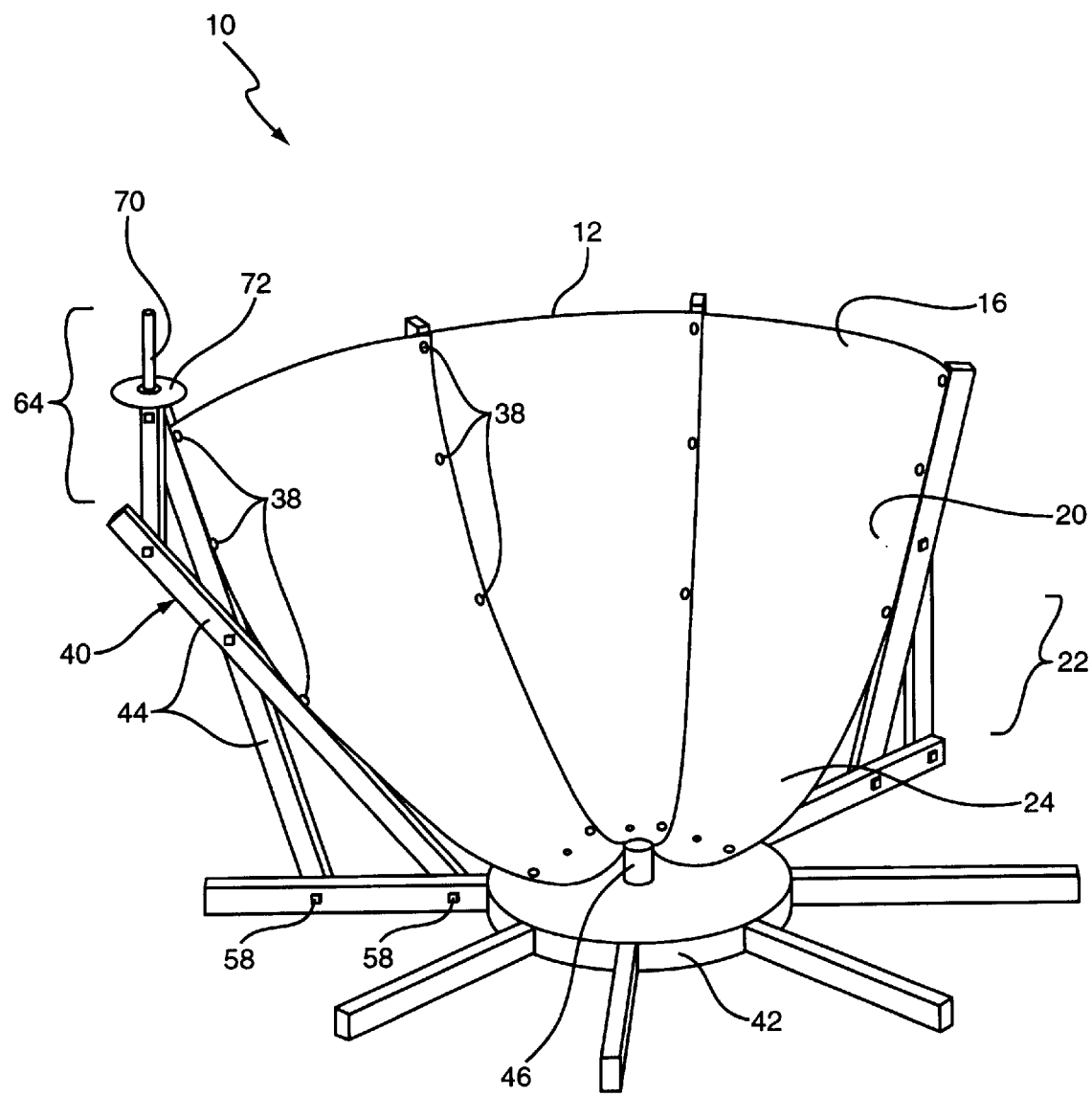
FIG. 1 is an isometric schematic of a partially assembled solar oven according to an embodiment of the present invention.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

To increase the intensity of solar radiation concentrated onto the diffuse focal zone, solar oven 10 optionally may further include a booster 16.

FIG. 1 depicts an isometric schematic of a partially completed solar oven 10 of the present invention. When completed, the solar oven 10 includes a multiple zone concentrator 12 for directing radiation for concentration onto a diffuse focal zone 30 (See e.g., FIG. 2 that shows a diffuse focal zone 30 including a central region 32 and an outer region 34). The solar oven 10 includes a plurality of reflective elements 20 having several zones. Among these zones are a first reflective zone 22, a second reflective zone 24 and, optionally, a booster 16. These zones of the reflective elements 20 have a geometry and are arranged so as to direct radiation for concentration onto diffuse focal zone 30. A receptor 14 is placed within the diffuse reflective zone 30 to be heated. The geometry and/or arrangement of the multiple zone concentrator 12 may be maintained using a frame 40 that may include a base 42 and support elements 44 extending from or interconnected to the base 42. Other aspects of solar oven 10 include the fasteners 58 that may be included to assemble the frame 40 and fasteners 38 that may be included to secure the reflective elements 20 to the frame 40.

Figure 2:
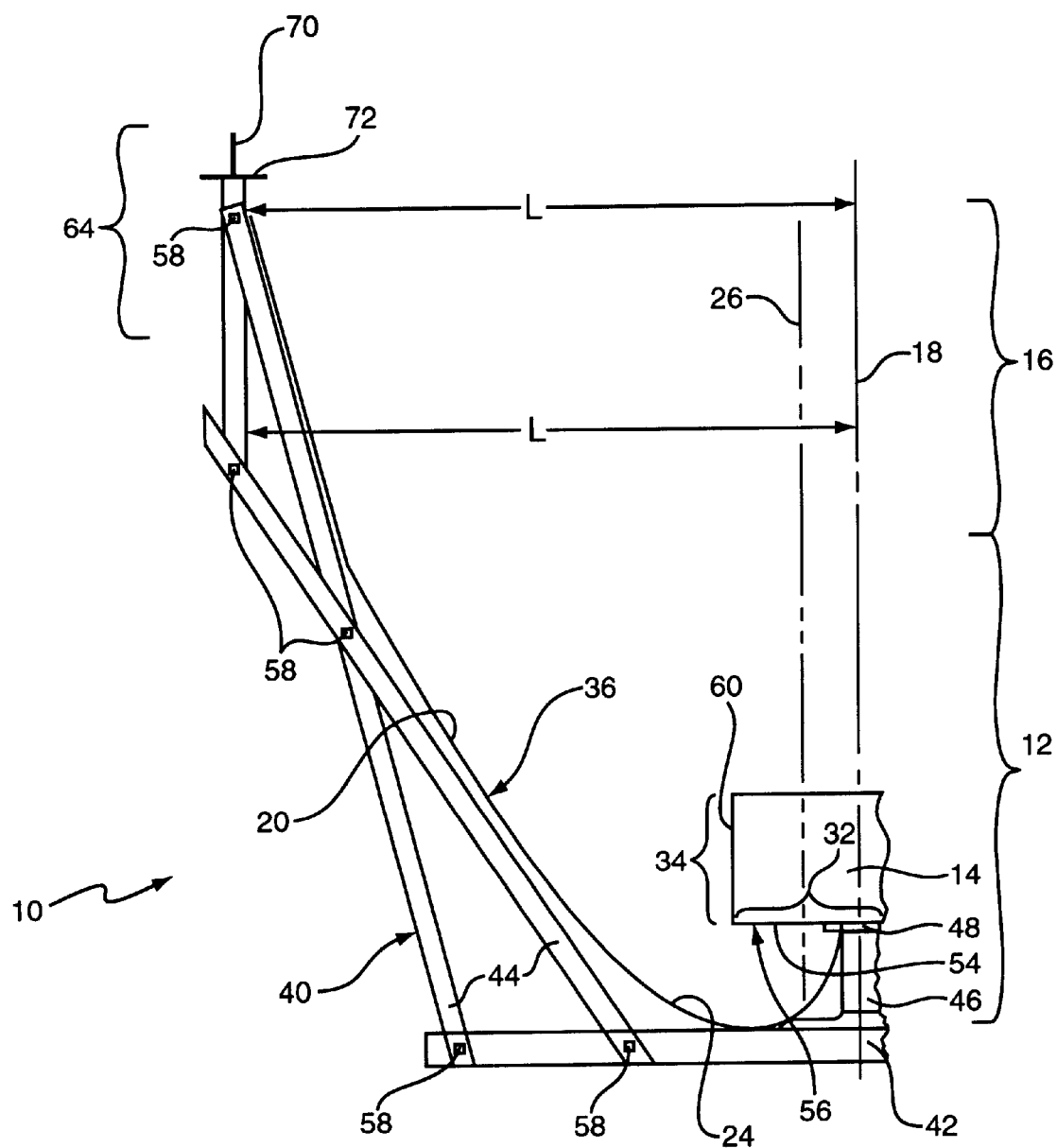
FIG. 2 is a cross-sectional schematic of a portion of the solar oven having a multiple zone concentrator of FIG. 1.

In addition, the solar oven 10 may include an alignment device 64 for aligning the solar oven 10 with the sun's azimuth. A simple and robust alignment device 64 is shown in FIGS. 1 and 2 as being built attached to frame 40. The alignment device 64 includes a rod 70 and a disk 72. In operation, this alignment device 64 is pointed toward the sun until rod 70 shows no shadow on disk 72. As seen in FIG. 2, the alignment element 64 is substantially aligned with a symmetry element 18 of solar oven 10. This allows for the proper alignment of solar oven 10 with the sun's azimuth to obtain the efficient capture of solar energy.

FIG. 2 is a cross sectional schematic of a portion of a solar oven 10 having a multiple zone concentrator 12 for concentrating solar radiation onto diffuse focal zone 30 that may include a receptor 14 according to the present invention. To increase the intensity of solar radiation that reflects onto diffuse focal zone 30, solar oven 10 may further include a booster 16.

Components of solar oven 10 include a reflective element 20 that is divided into a first reflective zone 22 and a second reflective zone 24. First reflective zone 22 matches to an axis of symmetry 26. In an aspect, axis of symmetry 26 corresponds to an axis for a conic section. Specific conic sections that might be used to describe first reflective zone 22 include parabolic, elliptical and hyperbolic sections.

Second reflective zone 24 is shaped to capture solar radiation directly from the sun and reflect the radiation to a central region 32 of a diffuse focal zone 30. When a booster 16 is included, second reflective zone 24 also directs radiation captured by the booster 16 to the central region 32 of the diffuse focal zone 30. The shape of second reflective zone 24 is generally a cardioid having its cusp ending substantially at the central region 32 of the diffuse focal zone 30.

The reflection of radiation from the first reflective zone 22 and the second reflective zone 24 combines to create the diffuse focal zone 30. This diffuse focal zone 30 includes the central region 32 and an outer region 34. In FIG. 2, the central region 32 is shown to be substantially horizontal while the outer region 34 is shown to be substantially vertical. The diffuse focal zone 30 exists to better distribute the reflected solar radiation onto the receptor 14 rather than focusing the reflected solar radiation into a sharp focal zone as seen in the prior art.

The distribution of reflected radiation onto receptor 14 diffusely provides more uniform heating and temperatures. This is particularly advantageous since users of the solar oven 10 will be accustomed to using conventional heating technology such as fire, an electrical range top, a gas range top, or some similar technology. By providing the diffuse focal zone 30, the cooking techniques that the user employs in using multiple zone concentrating solar oven 10 are substantially the same as those previously used. In the case of solar oven 10, the energy source is solar energy rather than directly using fossil fuels when burning wood, oil, or gas or the indirect use of fossil fuels when using electricity.

In an embodiment, the cross sectional schematic of FIG. 2 may be rotated around an element of symmetry 18 to create a generally circular cross section solar oven 10 of the present invention. In another embodiment, the cross sectional schematic of FIG. 2 may be reflected along element of symmetry 18 to create a generally elongated solar oven 10 (also known in the art as a trough solar oven) that may be used to heat an elongated receptor 14 according to the present invention.

Reflective element 20 is reflective material, and preferably is readily available. Such material may include a polished metal or metallic foil. Aluminum is a suitable metal. Applicant believes that the aluminum described in U.S. Pat. No. 5,760,981 (the disclosure of which is hereby incorporated in its entirety by reference in the present application) would be suitable. Further, the polished metal or metallic foil may include a protective coating. An alternative reflective material might be a polymer material that has been metalized through, for example, a physical vapor deposition process.

A frame 40 supports the plurality of reflective element 20. In an embodiment contemplated by the applicant, the frame 40 is integral with reflective element 20. In this embodiment, a molded material such as molded polymer might be coated with a reflective material to create an integral frame 40 and reflective element 20. In another embodiment of the present invention the frame 40 is separate. In either case, as illustrated in FIG. 1, the frame 40 may include a base 42 and reflective element supports 44.

In an embodiment of the present invention the materials for making reflective element 20 are provided to the user with instructions for making the solar oven 10. Included with the reflective material for making the reflective element 20 may be a template or stencil showing the user how to cut and assemble the materials to make the solar oven 10. Preferably, the reflective element 20 is provided precut and the user may then combine the plurality of reflective elements 20 with indigenous materials such as scrap lumber, small diameter branches, bamboo, tubing such as plumbing materials, and electrical conduit materials and the like to create the multiple zone concentrating solar oven 10.

Figure 3:
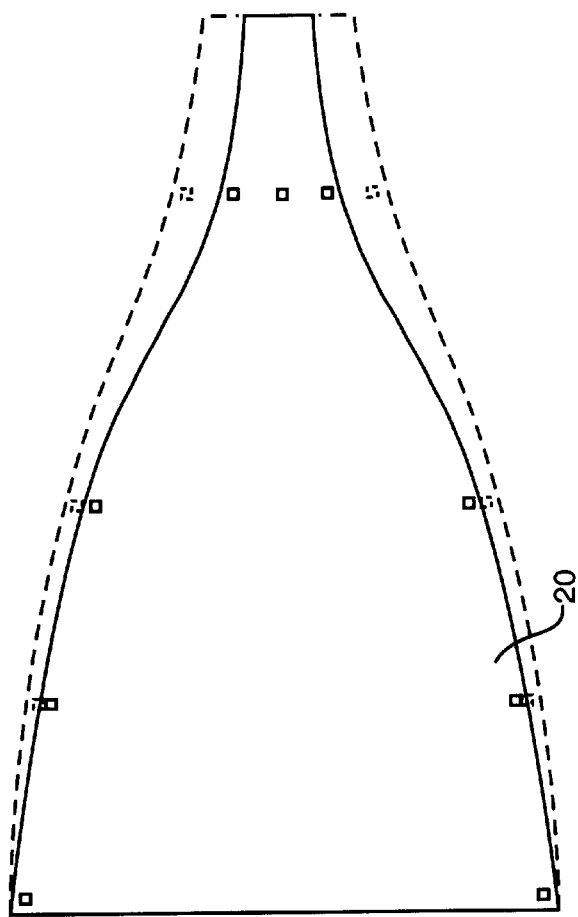
FIG. 3 is a schematic of a portion of the parts of a kit for a solar oven having a multiple zone concentrator of FIG. 1.
Figure 3:
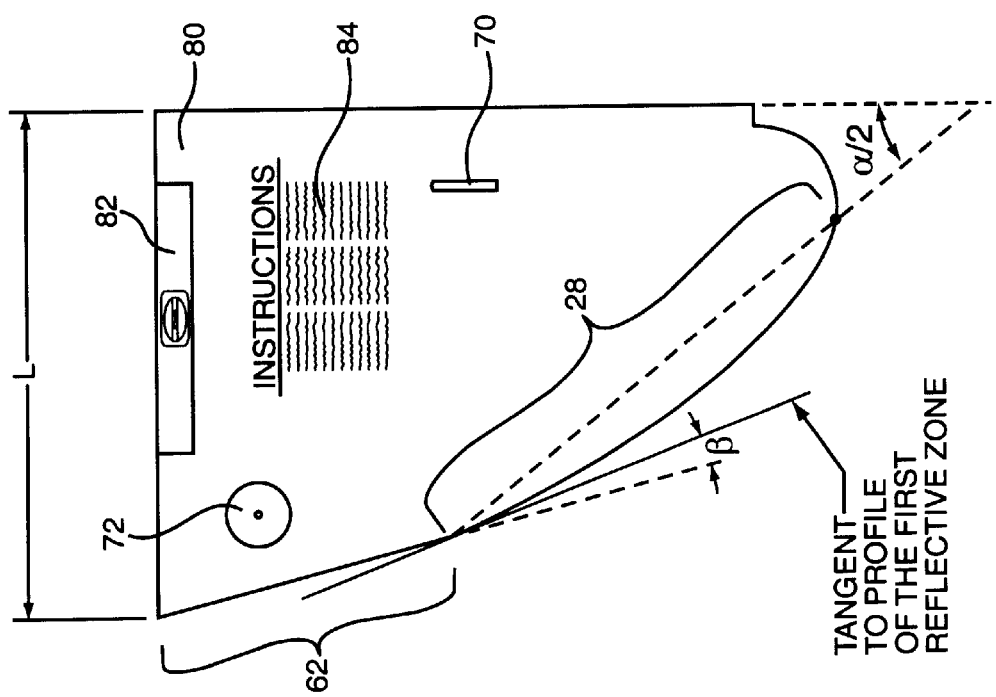

As shown in FIG. 3, solar oven 10 may be made from a kit that may include at least a template 80 and a plurality of reflective elements 20. Other items that may be further included either individually or in various combinations in kit 78 may include, for example, a disk 72 for the alignment element 64, a rod 70 for the alignment element 64, instructional indicia 84, and a level 82. Also, these items may be provided apart from or attached to template 80. When attached to template 80, the items would be provided in such a manner that, when appropriate, they may be separated from template 80.

Figure 7:
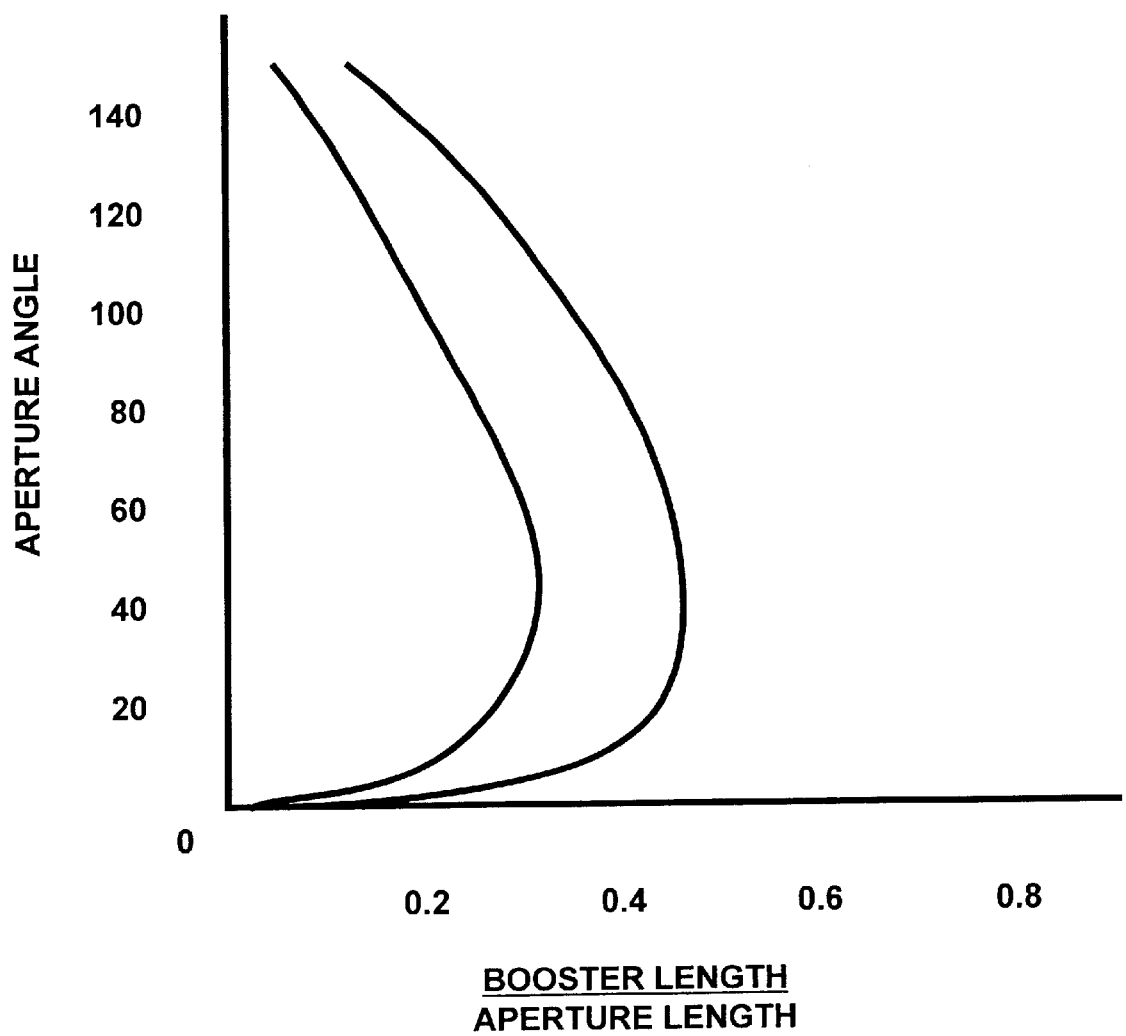
FIG. 7 depicts the interplay of the ratio of the booster length to aperture and the aperture angle of a solar oven according to an embodiment of the present invention.

FIG. 3 also provides some geometric relationships with regard to the construction of solar oven 10. In particular, as shown on the template 80, there is a booster length 62, an aperture angle $\alpha$ which is depicted as the half angle and designated $\alpha/2$. In addition, there is an aperture length 28. This aperture length may be determined from the end of the first reflective zone to a minimum location of the first reflective zone and the second reflective zone. A ratio of the aperture length and the booster length provides a method for tailoring the operation of solar oven 10 for use in a variety of latitudes. FIG. 7 depicts the interplay of the booster length to aperture length ratio as a function of the aperture angle $\alpha$. The area encompassed by the two curves is substantially the area of the workings of a solar oven 10 of the present invention.

Understanding that different indigenous materials are available in different geographic locations is an aspect of the present embodiment. In the United States and Canada, for example, indigenous materials include scrap lumber and plumbing parts that may be combined to create the frame 40 and a support 44. In tropical Third World regions, for example, indigenous materials may include bamboo pieces, yucca stems, cassava stems or mantioc stems, or other fairly straight and substantially rigid locally available materials. The inventor contemplates that any number or combinations of materials may be used to create the appropriate support structure for the reflective element 20.

In an embodiment of the present invention, the solar oven 10 having a multiple zone concentrator may further include a receptor support 46. Such a support may also include a leveling mechanism 50. An example of such a leveling mechanism 50 may include a universal-type joint head 52 such as that disclosed in U.S. Pat. No. 2,909,171 (the disclosure of which is hereby incorporated in its entirety by reference in the present application). The Applicant contemplates that any number of leveling-type mechanisms might be incorporated, for example, a simple ball joint, hinge joint or the like.

The receptor 14 may be a container of a type that could be used to contain the materials to be cooked. The receptor 14 is placed within the diffuse focal zone 30 in a manner to most effectively capture the reflected radiation of the multiple zone concentrator 12. The receptor 14 includes at least one absorbing surface 54 and that absorbing surface may further include a finished coating 56. Those skilled in the art will appreciate that coating 56 may be a finish or a coating or both.

Examples of different types of finished coatings include coatings that are painted and other types of coatings such as carbon black or an anodized or electroplated metal. The coating may be integral with the receptor 14. In the case that the receptor 14 is a cast iron pot, the blackening that results from its use over typical charcoal and wood combustion would be advantageous in transferring or absorbing the radiation for cooking. Such a coating may also be created by depositing carbon black or soot on the receptor by for example burning a candle or kerosene lantern near a surface of a receptor 14. The gray and darker coatings of commercially available cookware is sufficient for use as a receptor 14 and may be improved by adding another more highly absorbing surface film. The receptor 14 may also include a second absorbing surface 60. This type of surface has the advantage of capturing radiation in an additional area.

In another embodiment, the solar oven 10 having a multiple zone concentrator further includes a booster 16. The booster 16 is used to increase the amount of solar radiation captured by the solar oven 10. This may be particularly beneficial in non-tropical regions such as above the Tropic of Cancer and below the Tropic Of Capricorn or in colder and/or cloudier regions and times of the year. An aspect of the booster 16 is a substantially straight line profile. Other aspects of the booster 16 are that there is a ratio of the length of the aperture length 28 and the booster length 62 that may be varied to vary the amount of radiation captured by the receptor 14 and thereby provide certain efficiencies. In yet another aspect of the present invention concerns an angle "β" between a straight line profile of the booster 16 and a tangent to a profile of the first reflective zone 22 at the distal end of the first reflective zone 22. The value of the "β" angle may effect the manner and amount of solar radiation captured in the central region 32 versus the outer region 34. The angle "β" may be from about 2 degrees to about 25 degrees.

In operation, the multiple zone concentrator 12 increases the intensity of solar radiation that is reflected to receptor 14.

The solar oven 10 having a multiple zone concentrator further increases the intensity of solar radiation that is reflected to receptor 14 when booster 16 is included.

The first reflective zone 22 captures solar radiation from the sun, and reflects the radiation to the outer region 34. The second reflective zone 24 and booster 16, if present, captures solar radiation from the sun and reflects the radiation to the central region 32 of a diffuse focal zone 30. The combination of the radiation from the first reflective zone 22, the second reflective zone 24, and the efficient diffuse focal zone 30 creates the effective solar oven 10.

The users of the solar oven 10, otherwise familiar with more conventional heating technologies such as fire, an electrical range top, a gas range top and the like, may now use solar energy. This is particularly beneficial when the materials for making reflective element 20 are provided to the user with instructions for making the solar oven 10.

People in different geographic locations of the world may make use of different indigenous materials to make a multiple zone concentrating solar oven 10. In the United States and Canada, for example, people may use scrap lumber, angle iron and plumbing parts that may be combined to create the frame 40 and a support 44. In tropical Third World regions, for example, people may use bamboo pieces, yucca stems, cassava stems mantioc stems and small substantially straight branches.

The inclusion of a support such as a leveling mechanism 50 allows the user to point the axis 18 of the solar oven 10 at the sun while keeping the contents of a pot level. In this regard, to track the movement of the sun, the solar oven 10 may work without any adjustments during cooking or with a minimum of adjustments.

The following Tables 1 and 2 contain a summary of the sun angles at various latitudes and seasons.

TABLE 1

Northern Hemisphere/Summer Sun Angles at Various Latitudes

MID-JUNE 36° LATITUDE-SOLAR OVEN 10 IN USE AROUND MIDDAY

| | 10 a.m. | 11 a.m. | Solar Noon | 1 p.m. | 2 p.m. |
| --- | --- | --- | --- | --- | --- |
| Sun's Azimuth | 72.5° | 50.0° | 0.0° | 50.0° | 72.5° |
| Rate of Change | 22.5°/hr. | 50°/hr. | | 50°/hr. | 22.5°/hr. |

MID-JUNE 28° LATITUDE-SOLAR OVEN 10 IN USE AROUND MIDDAY

| | 10 a.m. | 11 a.m. | Solar Noon | 1 p.m. | 2 p.m. |
| --- | --- | --- | --- | --- | --- |
| Sun's Azimuth | 87.3° | 74.8° | 0.0° | 74.8° | 87.3° |
| Rate of Change | 12.5°/hr. | 74.8°/hr. | | 74.8°/hr. | 12.5°/hr. |

MID-JUNE 56° LATITUDE-SOLAR OVEN 10 IN USE AROUND MIDDAY

| | 10 a.m. | 11 a.m. | Solar Noon | 1 p.m. | 2 p.m. |
| --- | --- | --- | --- | --- | --- |
| Sun's Azimuth | 46.4° | 24.9° | 0.0° | 24.9° | 46.4° |
| Rate of Change | 21.5°/hr. | 24.9°/hr. | | 24.9°/hr. | 21.5°/hr. |

TABLE 2

Northern Hemisphere/Spring Sun Angles at Various Latitudes

MID-MARCH 36° LATITUDE-SOLAR OVEN 10 IN USE AROUND MIDDAY

| | 10 a.m. | 11 a.m. | Solar Noon | 1 p.m. | 2 p.m. |
| --- | --- | --- | --- | --- | --- |
| Sun's Azimuth | 44.5° | 24.5° | 0.0° | 24.5° | 44.5° |
| Rate of Change | 20°/hr. | 24.5°/hr. | | 24.5°/hr. | 20°/hr. |

MID-MARCH 28° LATITUDE-SOLAR OVEN 10 IN USE AROUND MIDDAY

TABLE 2-continued

Northern Hemisphere/Spring Sun Angles at Various Latitudes

| Sun's Azimuth | 10 a.m. | 11 a.m. | Solar Noon | 1 p.m. | 2 p.m. |
|---|---|---|---|---|---|
| | 50.9° | 29.7° | 0.0° | 29.7° | 50.9° |
| Rate of Change | 21.2°/hr. | 29.7°/hr. | 29.7°/hr. | 21.2°/hr. | |
| MID-MARCH 56° LATITUDE-SOLAR OVEN 10 IN USE AROUND MIDDAY | | | | | |
| Sun's Azimuth | 10 a.m. | 11 a.m. | Solar Noon | 1 p.m. | 2 p.m. |
| | 34.9° | 17.9° | 0.0° | 17.9° | 34.9° |
| Rate of Change | 17°/hr. | 17.9°/hr. | 17.9°/hr. | 17°/hr. | |

Observations On Sun Azimuth Angle Changes

Figure 4:
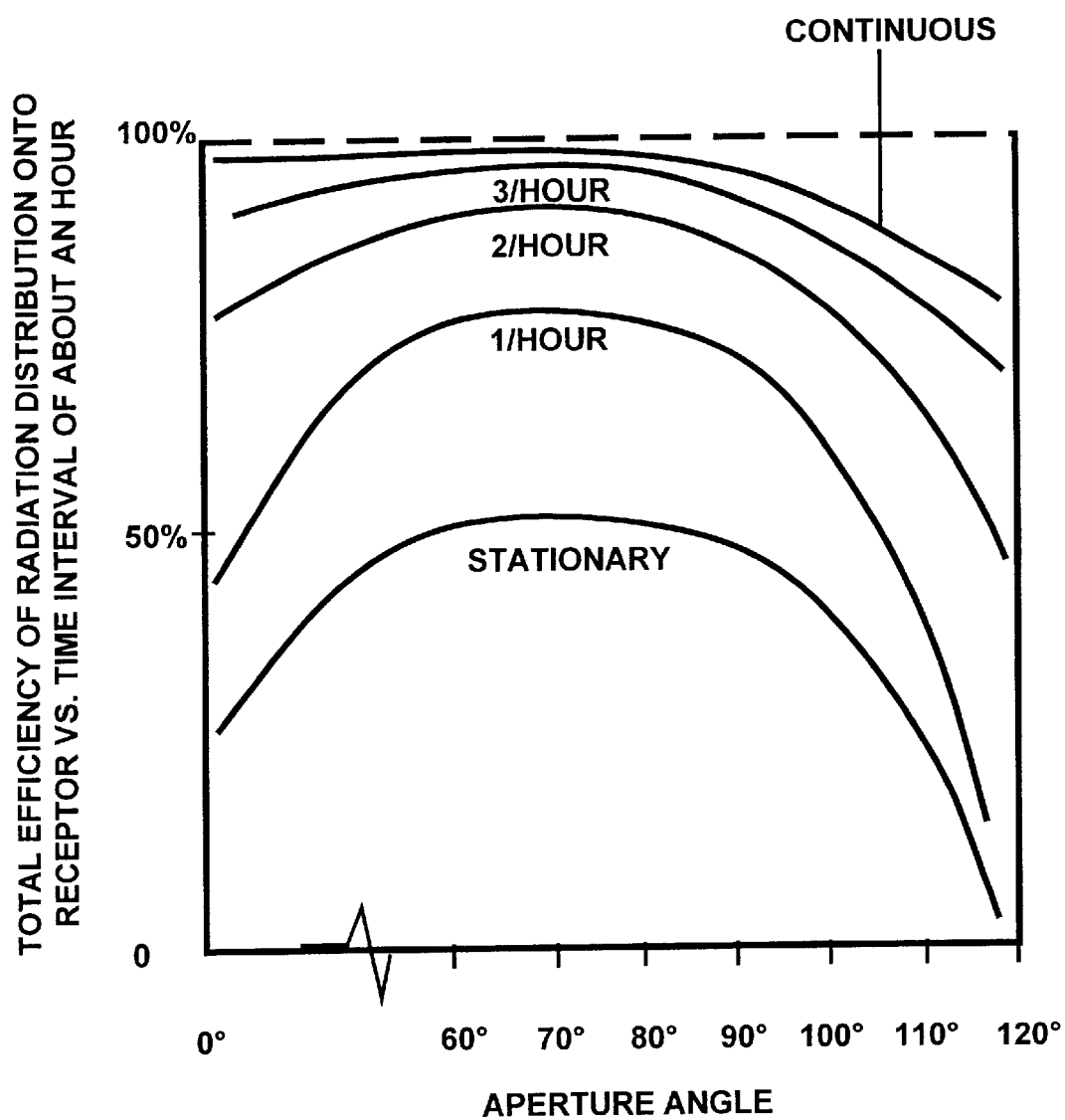
FIG. 4 depicts the effect of aperture angles of a solar oven on total efficiency as a function of the number adjustments per hour from a continuously adjusting solar oven to a stationary oven.

1. For any given latitude (temperature zones), the sun travels more degrees across the sky in the midday period. While this is typically the highest energy period of the day (filtered by the thinnest approach through the atmosphere) it may require more tilt adjustment of the solar oven 10 to maintain steady higher cooking temperatures. FIG. 4 provides a comparison of the operation of a solar oven of the prior art and of the present invention. In particular, depicted is an aperture angle α from 0° to 120° and the total efficiency of the oven. These efficiencies interrelate with the number of times that the solar oven is re-aligned with the sun. The upper-most curve shows the efficiency for a continuously adjusted oven over a range of aperture angles. The bottom-most curve depicts a solar oven 10 that is maintained stationary. Curves between the upper-most curve and the bottom-most curve are for a solar oven 10 of the present invention adjusted from about 1 time per hour to about 3 times per hour. In this manner, the present invention provides a practical solution for a technically unsophisticated user to use thus avoiding the continuously adjusting oven of the prior art. In this way, the solar oven 10 of the present invention is simple and requires little or no awareness of solar energy technology for operation.

Figure 6:
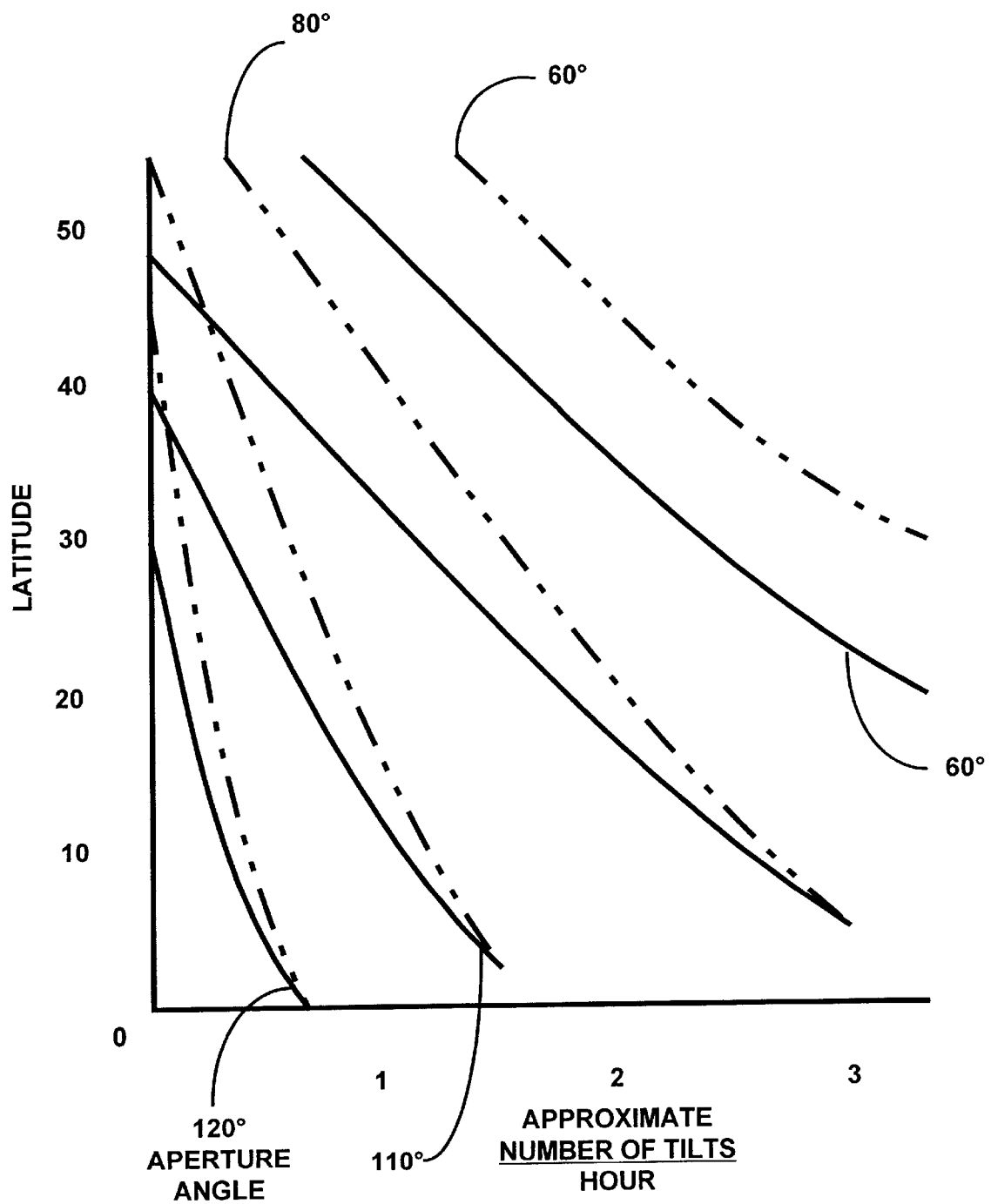
FIG. 6 depicts the interplay of season (summer as solid lines _____ verses winter as broken lines ------) aperture angle and the number of tilts per hour desired to maintain a more efficient alignment of a solar oven with the sun.

2. At more northern latitudes, the sun's daily path covers a narrower arc than in southern latitudes. This will require fewer tilt adjustments that the more southern locations for the same cooking time. However, the available solar energy level is lower the farther north one goes, and ambient temperatures tend to be lower, and maintaining a more optimal solar oven 10 orientation will capture more of the available solar radiation. FIG. 6 depicts the interplay of the latitude, the number of tilts per hour, the season and aperture angle α according to the present invention. In particular, the solid lines depict winter, while the dashed lines represent summer. As is seen from this graph, the optimal number of tilts per hour at lower latitudes increases as the aperture angle α is decreased. To maintain the oven substantially stationary or at 1 tilt per hour it is preferable to have a larger aperture angle α between 80° and 120°.

Figure 5:
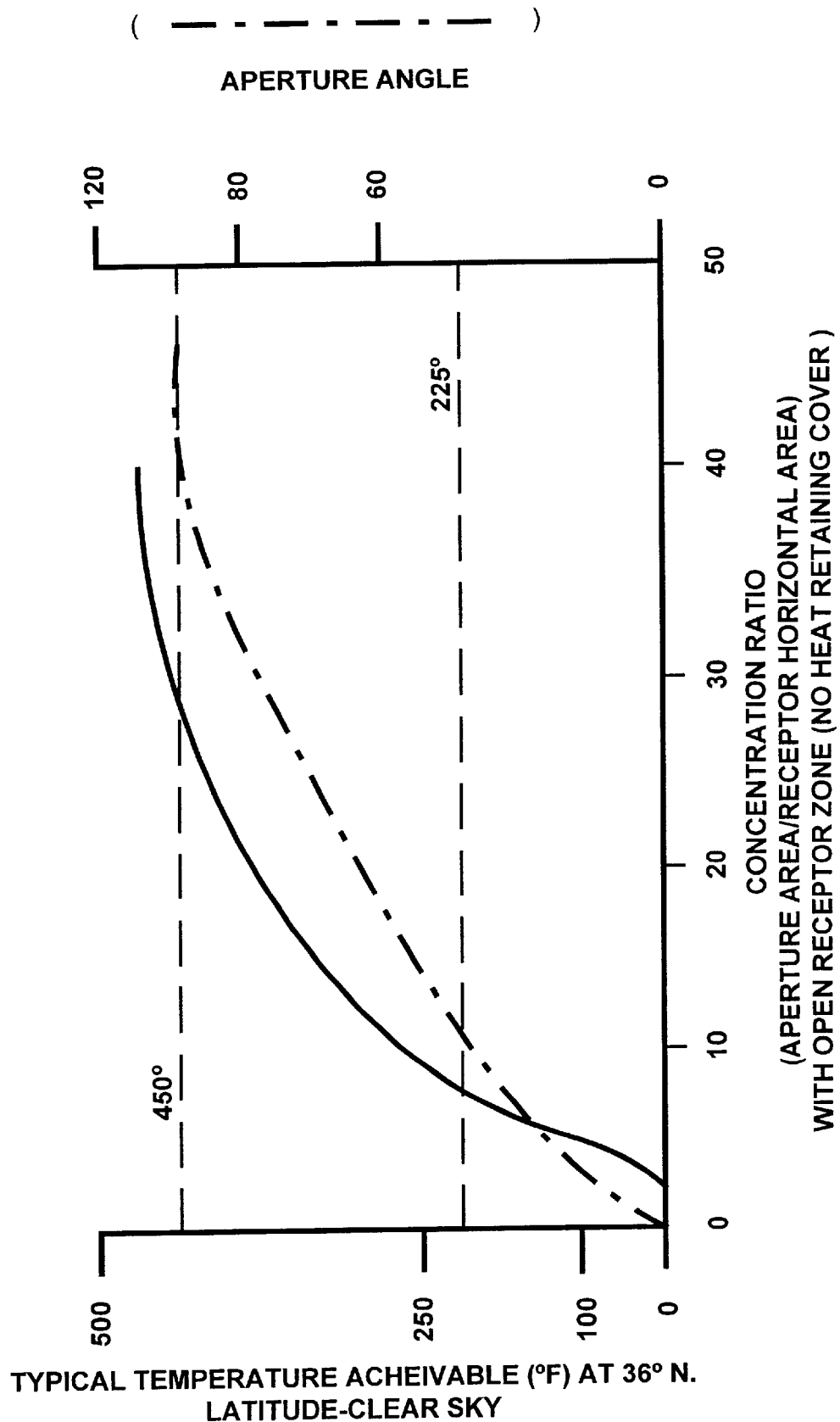
FIG. 5 depicts the achievable temperature for a diffuse focal zone as a function of concentration ratio (aperture area to receptor horizontal area) and the interplay of aperture angle on the achievable temperature.

3. Depending on the angle α of the opening or aperture angle α of the solar oven 10 sides, there will be a range of degrees of the sun's travel across the sky during which the optimal collection and distribution of solar energy on the reactor will occur. At wider arcs of sun movement, the efficiency of collection, distribution (reflection), and absorption will drop quickly. As observed above, in comparing the same time of day and year with actual sun azimuths of northern versus more southern (in the northern hemisphere—the opposite in southern hemisphere) locations the solar oven 10 may be designed with a wider aperture angle α for more southern locations to minimize the need for frequent tilt adjustments. In more northern locations the narrower solar oven 10 aperture angle α will work well since the arc of sun movement is less for the same time interval. FIG. 5 shows the interplay of the concentration ratio that is the aperture area over the horizontal receptor area and the aperture angle α of the base receptor.

4. If in windy conditions or periods of cooler ambient temperatures, the solar oven 10 is used and found to not achieve or maintain adequate cooking temperatures. A transparent, clear cover (this needs to be as optically clear as possible, i.e., acrylic versus polyethylene—or better still Tedlar® polyvinyl fluoride oriented or cast films available from E.I. du Pont de Nemours and Company, Wilmington, Del. may be placed over the solar oven 10 to retain some of the heat that may otherwise be convected or reradiated away from the absorber by colder temperatures and wind. Such a cover on the narrower aperture of the more northern design solar oven 10 will more than offset the light reflected off of the cover by raising the temperature around the receptor (cooking container). This is due to the fact that such a solar oven 10 will be oriented more closely to the most efficient acceptance angle for collecting solar energy (the more northern sun's path covers fewer degrees/hour than more southern locations). The opposite will be true for a more southern solar oven 10 with a wider aperture. It will be designed to collect solar energy over a wider arc of sun movement. When a clear cover is placed over it, the light will strike it over a wider range of incident angles and at those widest angles (that deviate from perpendicular to the cover by the greatest # of degrees) more of the light will be reflected off the cover and not be collected. This may be compensated for by making more frequent tilt adjustments of the solar oven 10 to maintain more optimal collection of light and less surface reflectance. Due to the more southern latitudes tendency to have warmer daytime ambient temperatures, a cover should be required less frequently than further north. Higher cooking temperatures are an additional reason a cover may be desirable at any latitude, however. Applicant has observed that when a cover is placed over the solar oven 10 while it is heating, care should be taken not to seal the edges too well against the solar oven 10 frame or sides as this will trap moisture escaping the pot while food is being heated. This moisture may condense on the bottom surface of the cover, and possibly reflective surfaces, especially if the air temperature difference between outside and inside the solar oven 10 is great enough.

It is clear that the possible different combinations of ambient temperature, latitude, local wind, presence of cloud cover, and desired cooking temperature levels are all significant factors that affect the optimal design of a solar energy solar oven 10. The design of a solar oven 10 for a single set of these conditions may be readily accomplished; however, it would be a design with fairly strict conditions that need to be met to operate successfully. It is not intended here to offer a design for such a limited application. It is known to those skilled in the art and thus conscious of daily and seasonal weather changes that a design that is robust enough to work with some cloudiness, some wind, some cooler temperatures, and is able to heat a variety of receptors (pots and pans) that are "off-the-shelf" items is much more desirable than a more limited design. From the above discussion of latitude's effect on solar energy availability it is also clear that latitude itself should be considered when designing the particular curve characteristics and overall aperture of the device. In short, the design of a device for a limited set of operating conditions would have little marketability and usefulness. For these reasons the applicant will now describe a range of values that allow the design of a device which will be useful over a reasonable set of operating conditions found from the equator through the cooler temperate latitudes (northern & southern hemispheres).

TABLE 3

Present Invention Compared to the Prior Art

| | Cost | Ease of Assembly | Reliability | Ease of Use | Effectiveness | Product of Previous Columns |
|---|---|---|---|---|---|---|
| Invention | 5 | 4 | 5 | 5 | 5 | 2500 |
| PRIOR ART | | | | | | |
| Portable/ Collapsible | 4 | 4 | 5 | 4 | 2 | 640 |
| Large/ Permanent | 3 | 2 | 4 | 3 | 4 | 288 |
| Tracking | 2 | 1 | 2 | 5 | 5 | 100 |

Table 3 summarizes a comparison between the present invention and various prior art ovens. The cost, ease of assembly, reliability and effectiveness of the invention and portable/collapsible, large/permanent and track solar ovens are rated from 1 to 5. An inadequate or poor rating is given a 1, a neutral rating is given a 3, and an exceptional rating is given a 5. A rating between inadequate or poor and neutral is given a 2 and a rating between neutral and exceptional is given a 4. To evaluate the combined rating, the rating for each category for the present invention and the prior art was determined. The present invention is clearly superior having a product rating of 2500.

Certain modifications and improvements will occur to those skilled in the art upon a reading of the foregoing description. It should be understood that all such modifications and improvements have been deleted herein for the sake of conciseness and readability but are properly within the scope of the following claims.

I claim:

1. A solar oven including
   (a) a diffuse focal zone;
   (b) a multiple zone concentrator having at least one reflective member for directing radiation to a plurality of portions of said diffuse focal zone, said reflective member having
      (i) a first reflective zone having a profile that captures and directs radiation to a first portion of said plurality of portions of said diffuse focal zone; and
      (ii) a second reflective zone adjacent a first end of said first reflective zone, said second reflective zone having a profile that captures and directs radiation to a second portion of said plurality of portions of said diffuse focal zone; and
   (c) a receptor support for supporting a receptor substantially within said diffuse focal zone.

2. The solar oven of claim 1 further including a booster adjacent a distal end of said first reflective zone for directing additional radiation to at least one of said first portion and said second portion of said plurality of portions of said diffuse focal zone.

3. The solar oven of claim 2 wherein said booster has a straight line profile.

4. The solar oven of claim 3 wherein said straight line profile creates an angle from about 2 degrees to about 25 degrees with a tangent to a profile of said first reflective zone at said distal end of said first reflective zone.

5. The solar oven of claim 2 wherein a length of said booster profile and an aperture length of said at least one reflective member has a ratio of about 0.1 to about 0.6.

6. The solar oven of claim 5 further including an aperture angle of about 40 degree to about 120 degrees.

7. A solar oven including
   (a) at least one of a element of symmetry;
   (b) a diffuse focal zone substantially aligned with said oven symmetry element, said diffuse focal zone including a central region and a peripheral region;
   (c) a multiple zone concentrator having at least one reflective member for directing radiation to a plurality of portions of said diffuse reflective zone, said reflective member having:
      (i) a first reflective zone including at least one of zonal element of symmetry offset from said oven symmetry element, said first reflective zone having a profile that captures and directs radiation to at least a portion of said peripheral region of said diffuse focal zone; and
      (ii) a second reflective zone adjacent a first end of said first reflective zone, said second reflective zone having a profile that captures and directs radiation to the central region of said diffuse focal zone; and
   (d) a receptor support for supporting a receptor substantially within said diffuse focal zone.

8. The solar oven according to claim 7 further including a frame for supporting said at least one reflective member.

9. The solar oven of claim 8 further including an alignment device for aligning said solar oven with a radiation source.

10. The solar oven of claim 9 wherein said alignment device including a rod substantially parallel to said oven symmetry element and substantially a substantially flat surface substantially perpendicular to said oven symmetry element.

11. The solar oven according to claim 8 wherein at least a portion of said frame and said at least one reflective member is integral.

12. The solar oven according to claim 8 wherein said frame and said at least one reflective member are separate.

13. The oven according to claim 8 further including a base for said frame.

14. The solar oven according to claim 7 further including a receptor juxtaposed to said receptor support.

15. The solar oven according to claim 14 wherein said receptor includes at least one absorber.

16. The solar oven according to claim 15 further including a coating on said at least one absorber.

17. The solar oven according to claim 16 wherein said coating is paint.

18. The solar oven according to claim 16 wherein said coating is carbon black.

19. The solar oven according to claim 16 wherein said coating is an anodized coating.

20. The solar oven according to claim 15 wherein said at least one absorber and said receptor are integral.

21. The solar oven of claim 14 wherein said receptor is at least one of a metal, a ceramic and a glass.

22. The solar oven of claim 21 wherein said metal is at least one of cast iron, steel, aluminum and stainless steel.

23. The solar oven according to claim 14 wherein the receptor is cookware.

24. The solar oven according to claim 23 wherein said cookware is at least one of a pot, a pan and a sheet.

25. The solar oven according to claim 7 wherein said receptor support provides structural reinforcement to said multiple zone concentrator.

26. The solar oven according to claim 7 wherein said receptor support further includes a leveling mechanism.

27. The solar oven according to claim 26 wherein the leveling mechanism further includes a universal joint-type.

28. The solar oven according to claim 14 further including a thermal insulator between said receptor and said receptor support.

29. The solar oven according to claim 28 wherein said insulator stabilizes the receptor.

30. The solar oven according to claim 28 wherein said thermal insulator is at least of a polymer, a ceramic and a natural insulating material.

31. The solar oven according to claim 7 wherein said central region is substantially horizontal.

32. The solar oven according to claim 7 wherein said peripheral region is substantially vertical.

33. The solar oven according to claim 7 wherein said profile of said first reflective zone is a conic section.

34. The solar oven according to claim 33 wherein said conic section is at least one of a parabola, an ellipse and a hyperbola.

35. The solar oven according to claim 33 wherein the conic section is a parabola.

36. The solar oven according to claim 7 wherein said reflective member is made using a reflective material.

37. The solar oven according to claim 36 wherein said reflective material is a polished metal.

38. The solar oven according to claim 37 further including a coating for protecting said polished metal.

39. The solar oven according to claim 38 wherein said polished metal is aluminum.

40. The solar oven according to claim 36 wherein said reflective material is a coated polymer.

41. The solar oven according to claim 40 wherein said coated polymer is metalized.

42. The solar oven according to claim 7 wherein a profile of said second reflective zone substantially resembles a portion of a cardioid.

43. The solar oven according to claim 7 wherein said oven symmetry element includes one of a plane of symmetry and an axis of symmetry.

44. The solar oven according to claim 43 wherein said zonal symmetry element includes one of a plane of symmetry and an axis of symmetry.

45. A solar oven including
(a) at least one of a element of symmetry;
(b) a diffuse focal zone substantially aligned with said oven symmetry element, said diffuse focal zone including a central region and a peripheral region;
(c) a multiple zone concentrator having at least one reflective member for directing radiation to a plurality of portions of said diffuse reflective zone, said reflective member having:
  (i) a first reflective zone including at least one of zonal element of symmetry offset from said oven symmetry element, said first reflective zone having a profile that captures and directs radiation to at least a portion of said peripheral region of said diffuse focal zone; and
  (ii) a second reflective zone adjacent a first end of said first reflective zone, said second reflective zone having a profile that captures and directs radiation to at least a portion of said central region of said diffuse focal zone;
(d) a receptor support for supporting a receptor substantially within said diffuse focal zone; and
(e) a booster adjacent a distal end of said first reflective zone for directing additional radiation to at least one of said peripheral region and said central region of said plurality of portions of said diffuse focal zone.

46. The solar oven of claim 45 wherein said booster has a straight line profile.

47. The solar oven of claim 46 wherein said straight line profile creates an angle from about 2 degrees to about 25 degrees with a tangent to a profile of said first reflective zone at said distal end of said first reflective zone.

48. The solar oven of claim 45 wherein a length of said booster profile and an aperture length of said at least one reflective member has a ratio of about 0.1 to about 0.6.

49. The solar oven of claim 48 further including an aperture angle of about 40 degree to about 120 degrees.

50. The solar oven according to claim 45 further including a frame for supporting said at least one reflective member.

51. The solar oven of claim 50 further including an alignment device for aligning said solar oven with a radiation source.

52. The solar oven of claim 51 wherein said alignment device includes a rod substantially parallel to said oven symmetry element and a substantially flat surface substantially perpendicular to said oven symmetry element.

53. The solar oven according to claim 50 wherein at least a portion of said frame and said at least one reflective member is integral.

54. The solar oven according to claim 50 wherein said frame and said at least one reflective member are separate.

55. The oven according to claim 50 further including a base for said frame.

56. The solar oven according to claim 45 further including a receptor juxtaposed to said receptor support.

57. The solar oven according to claim 56 wherein said receptor includes at least one absorber.

58. The solar oven according to claim 57 further including a coating on said at least one absorber.

59. The solar oven according to claim 58 wherein said coating is paint.

60. The solar oven according to claim 58 wherein said coating is carbon black.

61. The solar oven according to claim 58 wherein said coating is an anodized coating.

62. The solar oven according to claim 57 wherein said at least one absorber and said receptor are integral.

63. The solar oven of claim 56 wherein said receptor is at least one of a metal, a ceramic and a glass.

64. The solar oven of claim 63 wherein said metal is at least one of cast iron, steel, aluminum and stainless steel.

65. The solar oven according to claim 56 wherein the receptor is cookware.

66. The solar oven according to claim 65 wherein cookware is at least one of a pot, a pan and a sheet.

67. The solar oven according to claim 45 wherein said receptor support provides structural reinforcement to said multiple zone concentrator.

68. The solar oven according to claim 45 wherein said receptor support further includes a leveling mechanism.

69. The solar oven according to claim 68 wherein the leveling mechanism further includes a universal joint-type.

70. The solar oven according to claim 58 further including a thermal insulator between said receptor and said receptor support.

71. The solar oven according to claim 70 wherein said insulator stabilizes the receptor.

72. The solar oven according to claim 70 wherein said thermal insulator is at least one of a polymer, a ceramic and a natural insulating material.

73. The solar oven according to claim 45 wherein said central region is substantially horizontal.

74. The solar oven according to claim 45 wherein said peripheral region is substantially vertical.

75. The solar oven according to claim 45 wherein said profile of said first reflective zone is a conic section.

76. The solar oven according to claim 75 wherein said conic section is at least one of a parabola, an ellipse and a hyperbola.

77. The solar oven according to claim 75 wherein the conic section is a parabola.

78. The solar oven according to claim 45 wherein said reflective member is made using a reflective material.

79. The solar oven according to claim 78 wherein said reflective material is a polished metal.

80. The solar oven according to claim 79 further including a coating for protecting said polished metal.

81. The solar oven according to claim 80 wherein said polished metal is aluminum.

82. The solar oven according to claim 36 wherein said reflective material is a coated polymer.

83. The solar oven according to claim 82 wherein said coated polymer is metalized.

84. The solar oven according to claim 45 wherein a profile of said second reflective zone substantially resembles a portion of a cardioid.

85. The solar oven according to claim 45 wherein said oven symmetry element includes one of a plane of symmetry and an axis of symmetry.

86. The solar oven according to claim 85 wherein said zonal symmetry element includes one of a plane of symmetry and an axis of symmetry.

87. A kit for a solar oven including a diffuse focal zone, a multiple zone concentrator having at least one reflective member for directing radiation to a plurality of portions of the diffuse focal zone, the reflective member having a first reflective zone having a profile that captures and directs radiation to a first portion of the plurality of portions of the diffuse focal zone; and a second reflective zone adjacent a first end of the first reflective zone, the second reflective zone having a profile that captures and directs radiation to a second portion of the plurality of portions of the diffuse focal zone; and a receptor support for supporting a receptor substantially within the diffuse focal zone, said kit including:
    (a) a plurality of reflective elements, each reflective element configurable into at least portion of at least one reflective member for directing radiation to a plurality of portions of said diffuse reflective zone of said multiple zone concentrator having;
    (b) a template for configuring said plurality of reflective elements; and
    (c) instructions for using said template to configure said plurality of reflective elements to thereby assemble said solar oven.

88. The kit of according to claim 87 further including material for a booster adjacent a distal end of said first reflective zone for directing additional radiation to at least one of said first portion and said second portion of said plurality of portions of said diffuse focal zone.

89. The kit of according to claim 88 wherein said booster has a straight line profile.

90. The kit of according to claim 89 wherein said straight line profile creates an angle from about 2 degrees to about 25 degrees with a tangent to a profile of said first reflective zone at said distal end of said first reflective zone.

91. The kit of according to claim 89 wherein a length of said booster profile and an aperture length of said at least one reflective member has a ratio of about 0.1 to about 0.6.

92. The kit of according to claim 91 further including an aperture angle of about 40 degree to about 120 degrees.

93. A kit for a solar oven including a diffuse focal zone, a multiple zone concentrator having at least one reflective member for directing radiation to a plurality of portions of the diffuse focal zone, the reflective member having a first reflective zone having a profile that captures and directs radiation to a first portion of the plurality of portions of the diffuse focal zone; and a second reflective zone adjacent a first end of the first reflective zone, the second reflective zone having a profile that captures and directs radiation to a second portion of the plurality of portions of the diffuse focal zone; and a receptor support for supporting a receptor substantially within the diffuse focal zone, said kit including:
    (a) a plurality of reflective elements, each reflective element configurable into at least portion of at least one reflective member for directing radiation to a plurality of portions of said diffuse reflective zone of said multiple zone concentrator having;
    (b) a template for configuring said plurality of reflective elements;
    (c) an alignment device for aligning said solar oven with a radiation source; and
    (c) instructions for using said template to configure said plurality of reflective elements and said alignment device to thereby assemble said solar oven.

94. The kit according to claim 93 wherein said instruction provide guidance for forming a frame for supporting said at least one reflective member.

95. The kit according to claim 93 further includes a rod and a substantially flat surface for creating said alignment device.

96. The kit according to claim 94 further including a base for said frame.

97. The kit according to claim 93 wherein said receptor support provides structural reinforcement to said multiple zone concentrator.

98. The kit according to claim 93 further including a leveling mechanism for said receptor support.

99. The kit according to claim 98 wherein said leveling mechanism is a universal joint-type.

100. The kit according to claim 93 wherein said profile of said first reflective zone is a conic section.

101. The kit according to claim 100 wherein said conic section is at least one of a parabola, an ellipse and a hyperbola.

102. The kit according to claim 100 wherein the conic section is a parabola.

103. The kit according to claim 93 wherein said plurality of reflective elements are made using a reflective material.

104. The kit according to claim 103 wherein said reflective material is a polished metal.

105. The kit according to claim 104 further including a coating for protecting said polished metal.

106. The kit according to claim 104 wherein said polished metal is aluminum.

107. The kit according to claim 103 wherein said reflective material is a coated polymer.

108. The kit according to claim 107 wherein said coated polymer is metalized.

109. The kit according to claim 93 wherein a profile of said second reflective zone substantially resembles a portion of a cardioid.

110. The kit according to claim 93 wherein said oven has an element of symmetry including one of a plane of symmetry and an axis of symmetry.

111. The kit according to claim 110 wherein said first reflective zone has a zonal element of symmetry including one of a plane of symmetry and an axis of symmetry.

112. The kit according to claim 110 further including a level for assisting with the assembly of said solar oven.

\* \* \* \* \*